Patented Mar. 15, 1949

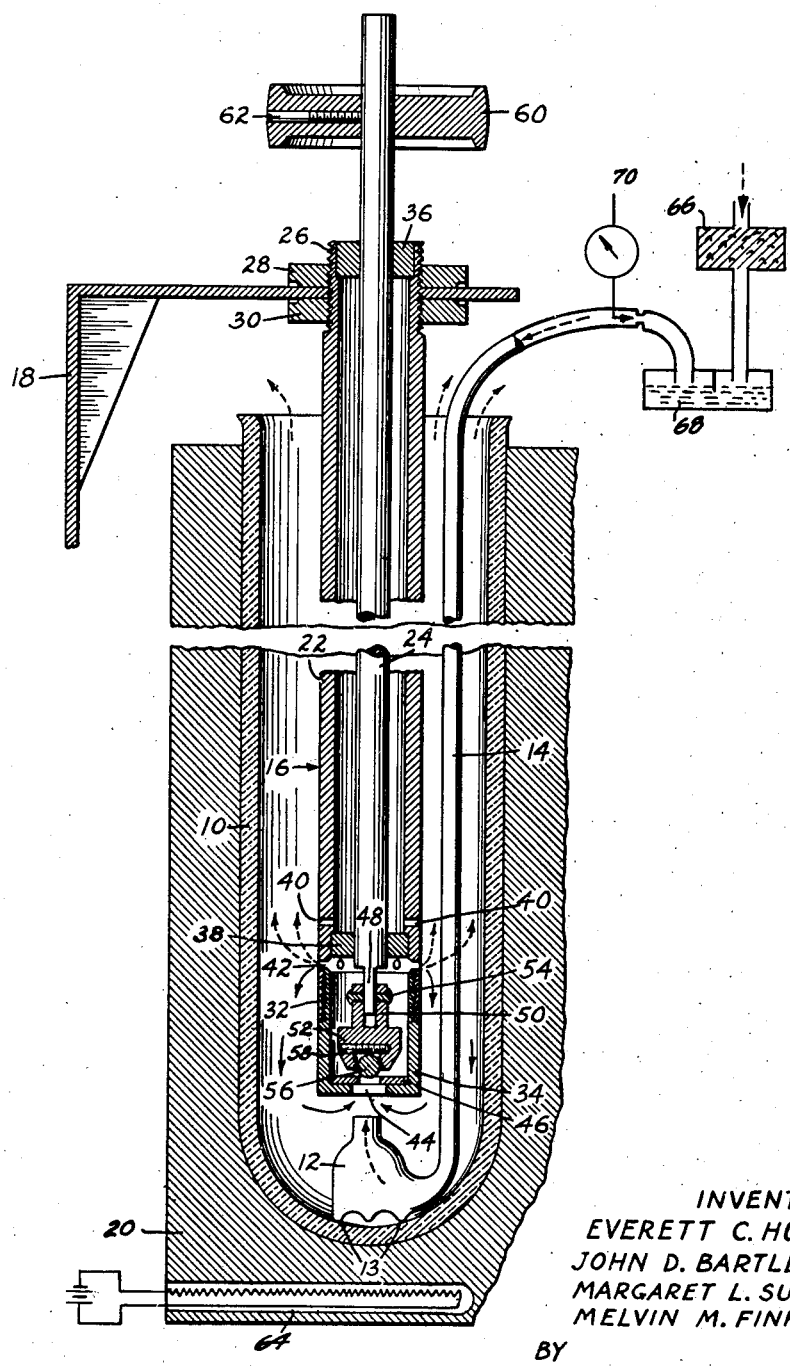
INVENTORS.
EVERETT C. HUGHES
JOHN D. BARTLESON
MARGARET L. SUNDAY
MELVIN M. FINK
BY
Campbell, Brumbaugh & Free
THEIR ATTORNEYS.

2,464,233

UNITED STATES PATENT OFFICE 2,464,233

APPARATUS FOR TESTING LUBRICATING OILS

Everett C. Hughes, Cleveland Heights, John D. Bartleson, Cleveland, Margaret L. Sunday, Cleveland Heights, and Melvin M. Fink, Parma, Ohio, assignors to The Standard Oil Company, Cleveland, Ohio, a corporation of Ohio Application November 29, 1946, Serial No. 713,062

4 Claims. (Cl. 73—64)

The present invention relates to apparatus for and a method of testing lubricants and particularly for investigating the corrosive effects of lubricating oils on engine bearings.

It is well known in the oil industry that lubricating oils designed for use in engines such as automobile engines are subjected to tests in a standard Chevrolet engine operating for 36 or 72 hours. At the end of a typical test run, the engine is more or less completely taken down so that the wear on the bearings can be measured accurately and visual determination can be made of the lacquering properties and sludge rating of the oil.

In spite of several attempts in the past to develop substitute apparatus for testing the corrosive and other qualities of lubricating oils, the Chevrolet engine test has of late become a specification test for heavy duty oils. The virtue of this test lies in the fact that it provides operating conditions that are to a certain extent similar to those to which an oil is ordinarily subjected. It is apparent, however, that the test is very expensive and laborious inasmuch as only one oil can be tested in an engine at one time and the engine is not designed for the frequent take-downs required to permit analyses of the corrosion, sludge and varnish ratings, for example, of different samples of oil. Furthermore, this engine test gives only a single corrosion result for a given oil after a 36 hour run and yields no information as to the corrosion result at a time shortly before or after this period even though such a value may be widely different and of importance in interpreting the field or service performance of an oil.

Attempts have been made to provide apparatus for and methods of testing lubricating oils, but thus far most of them have not been able to duplicate successfully the test conducted with the standard Chevrolet engine. Moreover, they have some rather undesirable characteristics, such as being of intricate construction, incapable of multiple operation, difficult to clean, and requiring the use of large samples of oil. In general, existing tests are deficient in that the weight losses, due to corrosion of the test pieces, are much lower than those incurred in engine operation when measured on a basis of equal area and often cover only a small and seemingly insignificant range.

The demand for a simpler test than that provided by the standard Chevrolet engine has become more acute with the development of higher performance engines and of oils containing detergents inasmuch as both of these developments tend to increase the severity of the corrosion problems.

An oil testing apparatus has been described in U. S. Patent No. 2,317,950, issued April 27, 1943, to Burke and Hughes, for testing the corrosive effects of lubricating oils due to oxidation of the oil and catalytic action thereon by the various metals with which a lubricating oil ordinarily comes into contact during the operation of an engine. The present invention is concerned with a substantial improvement of this apparatus that will make it possible to duplicate the wiping action of a journal rotating within a bearing, and that will therefore yield results that correlate still more closely with the results obtained by testing the same oil in a standard Chevrolet engine.

The salient object of the present invention is to provide apparatus for and a method of duplicating with a high degree of correlation the standard test performed on Chevrolet engines.

Another object of the present invention is to provide apparatus for and a method of testing the performance of lubricating oil in a simple and efficient manner that requires a minimum of time, a relatively small quantity of oil and avoids completely the laborious task of disassembling and reassembling an engine.

Another object is to provide a laboratory corrosion test into which there are incorporated practically all of the factors that are responsible for the corrosion of bearings in engines and wherein said factors can be adjusted in absolute and relative relation so as to correlate the test with service performance.

Still another object of the invention is to provide means wherein the erosive, catalytic and oxidative effects which are present in an engine and contribute to corrosion occur at rates equivalent to their rate of occurrence in the engine so that at the end of a laboratory test, their total effects are equivalent to their total effects in service.

Still another object of the invention is to provide means for testing the differences in oxidative and corrosive behavior of different types of oils and the modification of such behavior by the addition of additives such as corrosion inhibitors and the like.

A further object of the invention is to provide apparatus for and a method of testing lubricants that yields accurate results, is easy to use, adaptable to multiple operation, easy to clean, and is capable of readily reproducing temperature, speed, bearing load and atmospheric effects.

These and other objects will become apparent from the description of the invention that follows hereinafter.

By means of the present invention, the three most important corrosion factors, namely the erosive, catalytic and temperature factors are duplicated in apparatus of simple construction by providing a test unit positioned in a medium, the temperature of which can be accurately controlled, wherein the test unit contains different engine metals having catalytic effects in quantitative ratios corresponding to the amounts of said metals with which an oil in service comes into contact in an engine and is further provided with means for introducing air and duplicating a wiping action of journals in engine bearings. By this means, a standard 36-hour run of a standard Chevrolet laboratory test engine can be duplicated with great accuracy in 10 hours, and similarly a 72-hour run with a Chevrolet engine can be duplicated in 20 hours. It is also contemplated, and is in fact a preferred embodiment of this invention, to operate a number of such test units simultaneously, thus making it possible to test a considerable number of lubricating oils at one time. Furthermore, the equipment is readily disassembled, the service properties of the oils tested are determined and measured with utmost facility, and the various parts of the apparatus are accessible for easy cleaning.

In the annexed drawing, the sole figure is a part-sectional view of one test unit with the various parts assembled in operative relation.

A typical test unit, as shown for example in the drawing, includes a container 10, preferably of glass, a bubbler of air injector 12 spaced from the bottom of container 10 by any suitable means, such as 2 mm. glass tabs 13 and attached to an air inlet tube 14, and a test assembly 16 suspended within container 10 by means of a supporting arm 18. One or more, and preferably about twelve, such test units are placed in a constant temperature holder 20, which may be a suitable thermostatically controlled oil bath or bath of molten metal of low melting point, molten salts, etc., or a block of heat-conducting solid metal, such as aluminum, having heating elements such as resistance element 64 and containing recesses within which containers 10 fit to be heated thereby.

Test assembly 16 includes a sleeve or section of tubing 22, having mounted therein a rod or shaft 24. The upper end 26 of sleeve 22 is threaded to receive nuts 28 and 30 so that sleeve 22 may be fixed for support to a supporting arm 18. The lower end 32 of sleeve 22 is internally threaded to receive an externally threaded cup 34. Shaft 24 is maintained within sleeve 22 in the position shown by means of an oilite bearing 36 and a steel bearing 38, pressed into the upper end 26 and lower end 32 of sleeve 22, respectively. Immediately above steel bearing 38, sleeve 22 is provided with two holes 40, and immediately below steel bearing 38, sleeve 22 is provided with about eight ports 42. Steel cup 34 is provided at the bottom with a hole 44. A test piece 46 fits into the bottom of cup 34.

The lower end of shaft 24 is cut to form a tongue 48 that is adapted to fit between the yoke 50 of a swivel drill rod holder 52, the connection between tongue 48 and yoke 50 being secured by a pin 54 to produce a self-aligning yoke and pin coupling. A section of hardened steel drill rod 56 is fitted into swivel drill rod holder 52 and held in place by a set screw 58. The upper end of shaft 24 is provided with a pulley 60 which is affixed to shaft 24 by means of a suitable keyway or set screw 62.

The general practice of the invention includes placing a sample of the oil to be tested into container 10, inserting said container into constant temperature holder 20, inserting test assembly 16 into container 10 in the manner shown in the drawing, raising the temperature of holder 20 to the desired test temperature and rotating shaft 24 while bubbling air through bubbler 12.

At the conclusion of the test run, the service properties of the oil tested are found by determining the loss of weight of test piece 46, visually rating the lacquering properties of the oil by examining the coating applied to the outer surface of sleeve 22 and cup 34, and obtaining a visual sludge rating by examining the insoluble materials and used oil which are coated on the glass walls of container 10.

The conditions under which tests are carried out with equipment of the type described above may be varied in an infinite number of ways to correlate the test results with those that are obtained in service. Thus, for example, it is possible to vary the time and temperature at which the test is carried out, the relative amounts of catalytic and bearing material, the bearing load and rotational speed, the constitution of the bearing members, the quantity of oil and the rate of admission of air or the like, to correlate the conditions of the test to those encountered in service. If, for instance, it should be desired to test a number of oils to determine which one has optimum corrosive properties for an engine having parts of bearing metal, iron and aluminum, the areas of which coming into contact with oil are present in ratios of say 1:100:20, test piece 46 may be made of the same bearing metal, the assembly in the test unit comprising sleeve 22, shaft 24, holder 52, drill rod 56 and bearing may be made of steel, and cup 34 may be made of aluminum. The ratio of the areas of these parts available for contact with oil may likewise be in ratios of say 1:100:20.

By way of illustration, test units were constructed to provide correlation with test results obtained by means of tests carried out in the standard Chevrolet engine. In each test unit designed for this purpose, glass container 10 had an outside diameter of steel 1¾" and a length of 16½"; sleeve 22 was of steel and had an outside diameter of 1$\frac{3}{32}$" and a length of 15"; cup 34 was of steel and had outside and inside diameters of 1$\frac{3}{32}$" and $\frac{13}{16}$", respectively, a length of 1" and a ⅜" diameter hole 44; test piece 46 was of relatively fine grained copper-lead "Clevite 35", had outside and inside diameters of $\frac{13}{16}$" and ¼", respectively, and an exposed (when in operative position in cup 34) copper-lead surface of 3.0 sq. cm. including a loaded bearing area of 1.85 sq. cm; rod 24 was of steel and had a diameter of ⅜" and a length of 19"; drill rod 56 was a section of hardened steel of 51–57 Rockwell hardness and had a length of $\frac{21}{32}$" and a diameter of ¼"; pulley 60 was of brass and had a diameter of 2"; and the combined weight of pulley 60, rod 24, swivel 52, and drill rod 56 was 600 grams (±5 grams), the gravitational force of this assembly representing the thrust load on the bearing surface of test piece 46.

Before starting the tests, the glass parts are cleaned by the usual chromic acid method, rinsed and dried. The metal parts are washed with chloroform and with carbon disulfide and polished with emery cloth or steel wool. Test piece 46 is polished with a surface grinder or the like, cleaned, and weighed carefully. It is preferable to use a new test piece for every test.

107 cc. samples of oil were placed in each container 10, each container was placed in an electrically heated aluminum block 20, and a test assembly 16 was placed into each container 10 in the operative position shown in the drawing. Approximately one hour was then required to heat the aluminum block 20, the test unit and the oil to a temperature of 325° F. ±2° F. Air under constant pressure was then passed through a porous clay filter 66 to remove dust, through dilute sulfuric containing chromic acid, illustrated schematically at 68, to remove sulfur dioxide, and into air inlet tube 14, at a rate of 70 liters per hour, said rate being indicated by calibrated orifice type flow meters 70 and controlled by needle valves. Immediately after the flow of air was started, 0.10% by weight of lead bromide was added to the oil to simulate the effects on oil when the standard Chevrolet engine test is run with gasoline containing 3 cc. of tetraethyl lead per gallon.

The pulleys 60 of six such test units were then driven by a friction type belt at a speed of 675 R. P. M. for ten hours while the temperature of aluminum block 20 was maintained at 325° F. ±2° F. by means of a thermostat.

At the conclusion of the ten hour run, each test piece 46 was weighed to determine the change in weight during the test. Surprisingly, it was discovered that the weight loss of the bearing metal test piece between laboratory and engine was exactly equal when calculated on a basis of equal bearing area. Thus the test piece having a bearing area of 1.86 sq. cm. was found to lose the same number of milligrams of weight per sq. cm. as a bearing half shell of approximately 26 sq. cm. in the engine. Further tests showed that when the same test was conducted for twenty hours, the weight loss of the test piece per sq. cm. of bearing area was likewise equal to the weight loss of a bearing half shell per sq. cm. of bearing area after testing the same oil in a 72 hour Chevrolet engine test run. It was therefore concluded that the rate of corrosion of test piece 46 is exactly the same as that of the bearings in the standard Chevrolet engine test.

Accurate evaluations of the lacquering properties of the oils tests was obtained by a visual rating system applied to the outer surface of sleeve 22 and cup 34 in much the same manner that the piston skirt, cylinder walls, etc., are rated for varnish.

Sludge ratings were obtained by visual ratings of the insoluble materials and used oil coated on glass containers 10 in the same manner as such ratings are obtained at the conclusion of engine tests.

A sufficient volume of used oil was obtained from each test for the determination of the usual properties of used oils such as pentane insolubles, benzene solubles, viscosity increase and neutralization and saponification numbers.

All of the results obtained by means of the foregoing analyses were found to correspond very closely, that is, within about 10%, to those obtained by means of the "standard" 36-hour Chevrolet engine tests. Furthermore, the results obtained after a 20-hour run of the test equipment were found to correspond equally closely to those obtained by means of 72-hour Chevrolet engine tests.

The equipment is suitable for reuse after it has been cleaned as previously described. Holes 40 are particularly suitable for cleaning the interior of sleeve 22 between bearings 36 and 38.

During the test, the introduced air provides an air lift that effectively pumps or circulates the oil through a circulating passway comprising hole 44 in cup 34, the space between the bearing surface of test piece 46 and drill rod 56, the chamber formed by cup 34 and bearing 38, and ports 42 as shown by the arrows in solid lines. The air takes a similar course and escapes through the top of container 10 as shown by the arrows in dashed lines.

While specific measurements and conditions have been described that are designed to correlate the test results by means of the apparatus illustrated to those obtained or obtainable by means of a "standard" Chevrolet engine test, it is to be understood that the present invention is not limited to such specific construction or set of conditions because it is obvious that the variables involved can be changed considerably depending upon the results desired. The scope of the invention, therefore, is to be limited only by the scope of the appended claims.

We claim:

1. Means for testing oils, comprising a container for a sample of the oil, said container containing a sleeve providing selected catalytic surfaces and containing means for supporting within the sleeve a test piece having a bearing surface, a shaft rotatable in the sleeve and resting on said bearing surface, and ports to permit the oil to circulate through said sleeve; and means for agitating the oil to circulate through said sleeve.

2. Means for testing oils, comprising a container for a sample of the oil, said container containing a cupped sleeve providing selected catalytic surfaces spaced from said container and containing a test piece having a bearing surface, a rotatable shaft resting on said bearing surface, and ports to permit the oil to circulate through said cupped sleeve; a jet through which air can be injected into said container at a controlled rate; means for rotating said shaft; and means for maintaining the container contents at a selected temperature.

3. Means for testing oils, comprising a noncatalytic container for a sample of the oil, said container containing a cupped sleeve of steel containing a copper-lead test piece having a bearing surface, rotatable steel shaft provided at the lower end with a section of hardened steel drill rod resting on said bearing surface, and ports to permit the oil to circulate through said cupped sleeve; means for agitating the oil to circulate through said cupped sleeve; means for rotating said shaft; and means for maintaining the container contents at a selected temperature.

4. Means for testing oils, comprising a container for a sample of the oil, said container containing a vertically disposed sleeve providing selected catalytic surfaces, a cup fixed to the lower end of said sleeve, said cup having a perforated bottom and containing a test piece having a bearing surface, a rotatable shaft within said sleeve provided at the lower end with a bearing surface resting on the bearing surface of said test piece, and ports in said sleeve to permit the oil to circulate through said cups and said sleeve, means for agitating the oil to circulate through said cup and said sleeve, means for rotating said shaft, and means for maintaining the container contents at a selected temperature.

EVERETT C. HUGHES.
    JOHN D. BARTLESON.
    MARGARET L. SUNDAY.
    MELVIN M. FINK.

REFERENCES CITED

The following references are of record in the file of this patent:

UNITED STATES PATENTS

| Number | Name | Date |
|---|---|---|
| 1,044,317 | Wendt | Nov. 12, 1912 |
| 1,770,735 | Furk | July 15, 1930 |
| 2,033,588 | Pigott et al. | Mar. 10, 1936 |
| 2,274,541 | Fontana et al. | Feb. 24, 1942 |
| 2,317,950 | Burk et al. | Apr. 27, 1943 |
| 2,370,606 | Morgan et al. | Feb. 27, 1945 |